US008193486B2

(12) United States Patent
Liu et al.

(10) Patent No.: US 8,193,486 B2
(45) Date of Patent: Jun. 5, 2012

(54) SECURITY INSPECTION SYSTEM FOR PERSONS

(75) Inventors: Yinong Liu, Beijing (CN); Ziran Zhao, Beijing (CN); Li Zhang, Beijing (CN); Wanlong Wu, Beijing (CN); Jin Cui, Beijing (CN); Dongmei Yu, Beijing (CN); Mingliang Li, Beijing (CN)

(73) Assignee: Nuctech Company Limited, Beijing (CN)

( * ) Notice: Subject to any disclaimer, the term of this patent is extended or adjusted under 35 U.S.C. 154(b) by 273 days.

(21) Appl. No.: 12/491,458

(22) Filed: Jun. 25, 2009

(65) Prior Publication Data

US 2010/0072361 A1    Mar. 25, 2010

(30) Foreign Application Priority Data

Jun. 27, 2008    (CN) .......................... 2008 1 0115792

(51) Int. Cl.
*H01J 49/04* (2006.01)
(52) U.S. Cl. ..................... 250/288; 73/863.33
(58) Field of Classification Search ................... 250/288, 250/287; 73/863.33
See application file for complete search history.

(56) References Cited

U.S. PATENT DOCUMENTS

| | | | | |
|---|---|---|---|---|
| 4,839,143 A | * | 6/1989 | Vora et al. ................ | 422/98 |
| 5,162,652 A | * | 11/1992 | Cohen et al. .............. | 250/288 |
| 5,615,622 A | | 4/1997 | Moses et al. | |
| 6,375,697 B2 | * | 4/2002 | Davies ...................... | 55/340 |
| 7,023,339 B2 | * | 4/2006 | Stomski .................... | 340/540 |
| 7,337,686 B2 | | 3/2008 | Sagi-Dolev | |
| 2003/0085348 A1 | | 5/2003 | Megerle | |
| 2005/0237178 A1 | | 10/2005 | Stomski | |
| 2006/0243071 A1 | | 11/2006 | Sagi-Dolev | |

FOREIGN PATENT DOCUMENTS

| | | |
|---|---|---|
| CN | 201222058 Y | 4/2009 |
| EP | 0383611 A2 | 8/1990 |
| JP | 2004-69576 A | 3/2008 |
| WO | WO 99/21148 | 4/1999 |
| WO | WO 9921148 A1 | 4/1999 |
| WO | WO 2005/029053 | 3/2005 |

OTHER PUBLICATIONS

European Search Report dated May 11, 2010 issued in corresponding European Application No. 09 00 8126.

* cited by examiner

*Primary Examiner* — Jack Berman
(74) *Attorney, Agent, or Firm* — Kenyon & Kenyon LLP

(57) ABSTRACT

The invention provides a security inspection system for inspecting persons, characterized in that it comprises: a passageway which provides an inspection space isolated or partially isolated from an ambient environment, in which at least one sub-passageway allowing persons to be inspected to pass is provided in the inspection space, and each of the sub-passageways is provided with at least one millimeter wave imaging device for millimeter wave imaging of persons being inspected; and an ion mobility spectrometer for ionizing particles of substance or gases that are released or volatilized from the inspected persons into the air in the passageway and then measuring a mobility rate thereof under the action of the electric field to effect identification of substances. At least one radioactive substance inspection device may also be provided in the passageway to detect whether the person being inspected carries radioactive substances.

18 Claims, 2 Drawing Sheets

SECURITY INSPECTION SYSTEM FOR PERSONS

RELATED APPLICATION

Figure 1:
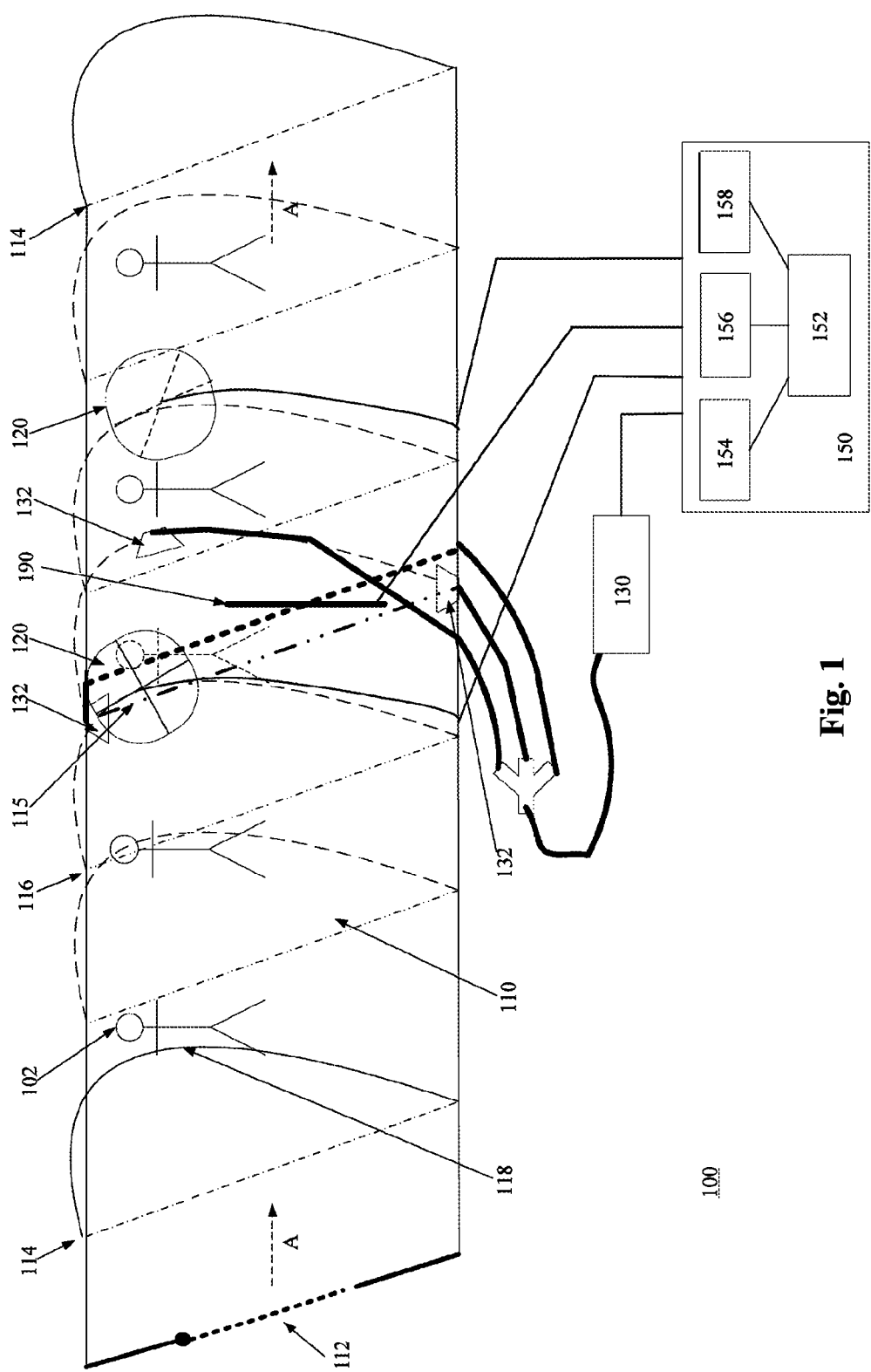

This application claims priority to Chinese Patent Application No. 200810115792.1, filed Jun. 27, 2008, which is incorporated herein by reference in its entirety.

TECHNICAL FIELD

The present invention relates to security inspection, particularly to a corridor-like security inspection system for continuously and automatically inspecting persons (including things carried by them).

BACKGROUND ART

Security inspection technology and apparatus are extensively applied to airports, railway stations, seaports, customs houses and other important sites needing security inspection to carry out inspection of bodies of persons, luggage and bulk goods and containers mainly in respect of inspection and detection of explosives, drugs and metal arms.

An ordinary technology for continuously and automatically carrying out security inspection of persons is a security inspection door which employs pulse magnetic field eddy current inspection technology. The pulse magnetic field emitted by an emitting coil generates an eddy current in a metal. A secondary induction magnetic field generated by the eddy current destroys balance of the original magnetic field, is received by a receiving coil, and generates an alarm after treatment of an electric circuit. This security inspection technology has advantages such as good reliability, high inspection efficiency and simple manipulation. However, it can be used to inspect very limited types of articles, generally can only determine whether the persons being inspected carry metal-type prohibited articles.

To effectively inspect more types of prohibited articles by a security inspection system and meanwhile ensure protecting the persons being inspected from possible radiation damages, all the countries in the world are exploring and researching more advanced security inspection technology, such as ion scanning technology and millimeter wave technology.

Of the technologies, ion mobility technology relates to collecting fine particles of a substance to be analyzed or volatilized gases as sampling gases into a detector. Then the sampling gas, subject to ionization, forms substance ions. An electric field is applied to the substance ions resulting from the ionization to make them move. Since mobility rate of the substance ions is related to ion mass, number of electric charges, size of ions and mobility environment, mobility rate of the substance ions can be considered as a parameter for identifying characteristics of substance. Since a majority of explosives and drugs can be gasified and ionized into negative ions and positive ions, ion mobility technology can be regarded as a method for security inspection, particularly for detection of trace substance.

Use of millimeter wave technology for security inspection in essence means use of the properties that the millimeter wave can permeate ordinary clothes and millimeter wave emission rate and reflection coefficient of various substances vary (metals are more distinct from other substances in this regard). Security inspection by millimeter wave technology does not have ionizing radiation, does not require complicated protection against radiation and contact with human body, so it is an ideal technology for security inspection.

Nevertheless, currently the millimeter wave technology exhibits a limited resolution and can only detect larger pieces of substance. More unfavorably, the millimeter wave technology usually can do nothing about substances concealed behind metals.

In addition, in the present-day security inspection systems for persons, inspection of radioactive substances such as uranium increasingly draws people's attention. It is not only complex but also time-consuming to use an independent device to inspect persons in respect of any radioactive substances after inspection of conventional prohibited articles as mentioned above, and moreover, there is a certain hidden danger of security because various necessary security inspections cannot be simultaneously carried out.

SUMMARY OF THE INVENTION

A first objective of the present invention is to provide a security inspection system for inspecting persons, which, during operation, does not require contact with a human body and removal of cloths of the persons being inspected, and does not have ionizing radiation, and which can accurately detect substances with a dimension greater than one millimeter as well as trace volatile substances to effectively distinguish drugs, explosives and other prohibited articles.

A second objective of the present invention is to provide a security inspection system for inspecting persons, which, during operation, does not require contact with a human body and removal of cloths of the persons being inspected and does not have ionizing radiation, and which can accurately detect substances with a dimension greater than one millimeter as well as any radioactive substance of any dimension.

A third objective of the present invention is to provide a security inspection system for inspecting persons, which can accurately detect not only trace volatile substances to effectively distinguish drugs, explosives and other prohibited articles but also any radioactive substance of any dimension.

A further objective of the present invention is to provide a security inspection system for inspecting persons, which, during operation, does not require contact with a human body and removal of cloths of the persons being inspected and does not have ionizing radiation, and which can not only accurately detect substances with a dimension greater than one millimeter as well as trace volatile substances to effectively distinguish drugs, explosives and other prohibited articles, but also detect any radioactive substance of any dimension. Preferably, it is desirable that the above various systems can be configured to continuously, automatically and effectively carry out security inspection of persons.

According to a first aspect of the present invention, a security inspection system for inspecting persons is provided, comprising: a passageway which provides an inspection space isolated or partially isolated from an ambient environment, at least one sub-passageway allowing persons to be inspected to pass is provided in the inspection space, and each of the sub-passageways is provided with at least one millimeter wave imaging device for millimeter wave imaging of persons being inspected; an ion mobility spectrometer for ionizing particles of substance or gases that are released or volatilized from the inspected persons into the air in the passageway and then measuring a mobility rate thereof under the action of the electric field to effect identification of substances.

In a further embodiment of the first aspect of the present invention, the security inspection system for inspecting persons further comprises a control table for controlling operation of the at least one millimeter wave imaging device and the ion mobility spectrometer and for receiving data from the at least one millimeter wave imaging device and the ion mobility spectrometer for processing.

In a further embodiment of the first aspect of the present invention, an isolation means is provided at both ends of the passageway to keep the entrance and exit of the passageway at least partly isolated from the ambient environment. Furthermore, an entrance limiting unit is provided in front of the isolation means at the entrance to the passageway to control the passing of persons to be inspected. Besides, the isolation means can be made of a plastic curtain for at least partially isolating the entrance and exit of the passageway from the ambient environment. Alternatively or preferably, the isolation means can be an automatic door such as an automatic glass door to keep the entrance and exit of the passageway isolated from the ambient environment as well as to control the persons in and out of the passageway of inspection.

In a further preferred embodiment of the first aspect of the present invention, in each of the sub-passageways is marked a measuring line or measuring area. An infrared apparatus is mounted on the measuring line or measuring area to detect whether the person reaches the measuring line or the measuring area or not.

In a further embodiment of the first aspect of the present invention, the at least one millimeter wave imaging device comprises two passive millimeter wave imaging devices disposed at the location of a canopy of the passageway and respectively disposed on both sides of the measuring line or measuring area in the lengthwise direction of the passageway; furthermore, the aperture planes of the antenna of the two passive millimeter wave imaging devices form an angle with respect to the ground surface and face the measuring line or measuring area. Preferably, the aperture planes of the antenna of the two passive millimeter wave imaging devices form an angle of 60 degrees with respect to the ground surface.

In a further embodiment of the first aspect of the present invention, the at least one millimeter wave imaging device further comprises two additional passive millimeter wave imaging devices respectively disposed on both sides of the person being inspected along the measuring line or measuring area to detect both sides of the person being inspected. Furthermore, the antenna aperture planes of the two additional passive millimeter wave imaging devices form an angle with respect to the ground surface and face both sides of the person being inspected along the measuring line or measuring area. Preferably, the antenna aperture planes of the two additional passive millimeter wave imaging devices form an angle of 60 degrees with respect to the ground surface.

In a further preferred embodiment of the first aspect of the present invention, the at least one millimeter wave imaging device comprises four passive millimeter wave imaging devices respectively disposed about the person being inspected away from an advancing path of the person being inspected and respectively effecting imaging of the person being inspected at four angles: left front, left rear, right front, and right rear. Preferably, the four passive millimeter wave imaging devices are orientated so that connecting lines between them and a center point of the measuring line or measuring area are respectively at about 45 degrees, 135 degrees, 225 degrees and 315 degrees with respect to the advancing direction of the person being inspected, and their respective aperture planes of antenna properly face a vertical line through the center point of the measuring line or measuring area.

In a further preferred embodiment of the first aspect of the present invention, the ion mobility spectrometer uses $\beta$ rays emitted by $Ni^{63}$ to ionize a gas or fine particles.

In a further preferred embodiment of the first aspect of the present invention, the ion mobility spectrometer is provided with at least one sampling port. Preferably, the at least one sampling port comprises three sampling ports provided in a vertical plane where the measuring line or measuring area lies.

In a further preferred embodiment of the first aspect of the present invention, a least one radioactive substance inspection device is provided in the passageway to detect whether the person being inspected carries radioactive substances. Preferably, each of the at least one radioactive substance inspection device is configured to inspect one or more of the at least one sub-passageway. Furthermore, the security inspection system of persons further comprises a control table for controlling operation of the at least one millimeter wave imaging device, the ion mobility spectrometer and the at least one radioactive substance inspection device and for receiving data from the at least one millimeter wave imaging device and the ion mobility spectrometer and the at least one radioactive substance inspection device for processing.

According to a second aspect of the present invention, a security inspection system for inspecting persons is provided, comprising: a passageway which provides an inspection space isolated or partially isolated from an ambient environment, at least one sub-passageway allowing persons to be inspected to pass is provided in the inspection space, and each of the sub-passageways is provided with at least one millimeter wave imaging device for millimeter wave imaging of persons being inspected; and at least one radioactive substance inspection device is provided in the passageway to detect whether the person being inspected carries radioactive substances.

In a further embodiment of the second aspect of the present invention, the security inspection system of persons further comprises a control table for controlling operation of the at least one millimeter wave imaging device and the radioactive substance inspection device and for receiving data from the at least one millimeter wave imaging device and the radioactive substance inspection means for processing.

In a further preferred embodiment of the second aspect of the present invention, an ion mobility spectrometer is provided in the passageway to ionize particles of substance or gases that are released or volatilized from the inspected persons into the air in the passageway and then measuring a mobility rate thereof under the action of an electric field to effect identification of substances. Furthermore, the security inspection system for inspecting persons further comprises a control table for controlling operation of the at least one millimeter wave imaging device, the ion mobility spectrometer and the at least one radioactive substance inspection device and for receiving data from the at least one millimeter wave imaging device, the ion mobility spectrometer and the at least one radioactive substance inspection device for processing. Furthermore, an isolation means is provided at both ends of the passageway to keep the entrance and exit of the passageway at least partly isolated from the ambient environment. Preferably, an entrance limiting unit is provided in front of the isolation means at the entrance to the passageway to control the passing of persons to be inspected. Besides, the isolation means can be made of a plastic curtain for at least partially isolating the entrance and exit of the passageway from the ambient environment. Alternatively or preferably, the isolation means can be an automatic door such as an automatic glass door to keep the entrance and exit of the passageway isolated from the ambient environment as well as to control the persons in and out of the passageway of inspection.

In a further preferred embodiment of the second aspect of the present invention, in each of the sub-passageways is marked a measuring line or measuring area. An infrared apparatus is mounted on the measuring line or measuring area to detect whether the person to be inspected reaches the measuring line or the measuring area or not.

In a further preferred embodiment of the second aspect of the present invention, the at least one millimeter wave imaging device comprises two passive millimeter wave imaging devices disposed at the location of a canopy of the passageway and respectively disposed on both sides of the measuring line or measuring area in the lengthwise direction of the passageway; furthermore, the aperture planes of the antenna of the two passive millimeter wave imaging devices form an angle with respect to the ground surface and face the measuring line or measuring area. Preferably, the aperture planes of the antenna of the two passive millimeter wave imaging devices form an angle of 60 degrees with respect to the ground surface.

In a further embodiment of the second aspect of the present invention, the at least one millimeter wave imaging device further comprises two additional passive millimeter wave imaging devices respectively disposed on both sides of the person being inspected along the measuring line or measuring area to detect both sides of the person being inspected. Furthermore, the antenna aperture planes of the two additional passive millimeter wave imaging devices form an angle with respect to the ground surface and face both sides of the person being inspected along the measuring line or measuring area. Preferably, the antenna aperture planes of the two additional passive millimeter wave imaging devices form an angle of 60 degrees with respect to the ground surface.

In a further preferred embodiment of the second aspect of the present invention, the at least one millimeter wave imaging device comprises four passive millimeter wave imaging devices respectively disposed about the person being inspected away from an advancing path of the person being inspected and respectively effecting imaging of the person being inspected at four angles: left front, left rear, right front, and right rear. Preferably, the four passive millimeter wave imaging devices are orientated so that connecting lines between them and a center point of the measuring line or measuring area are respectively at about 45 degrees, 135 degrees, 225 degrees and 315 degrees with respect to the advancing direction of the person being inspected, and their respective antenna aperture planes properly face a vertical line through the center point of the measuring line or measuring area.

In a further preferred embodiment of the second aspect of the present invention, the ion mobility spectrometer uses β rays emitted by $Ni^{63}$ to ionize a gas or fine particles.

In a further preferred embodiment of the second aspect of the present invention, the ion mobility spectrometer is provided with at least one sampling port. Preferably, the at least one sampling port comprises three sampling ports provided in a vertical plane where the measuring line or measuring area lies.

In a further preferred embodiment of the second aspect of the present invention, each of the at least one radioactive substance inspection device is configured to inspect one or more of the at least one sub-passageway.

According to a third aspect of the present invention, a security inspection system for inspecting persons is provided, comprising: a passageway which provides an inspection space isolated or partially isolated from an ambient environment, an ion mobility spectrometer is provided in the passageway to ionize particles of substance or gases that are released or volatilized from the inspected persons into the air in the passageway and then measuring a mobility rate thereof under the action of an electric field to effect identification of substances; at least one radioactive substance inspection device is provided in the passageway to detect whether the person being inspected carries radioactive substances.

In a further embodiment of the third aspect of the present invention, the security inspection system of persons further comprises a control table for controlling operation of the ion mobility spectrometer and the at least one radioactive substance inspection device and for receiving data from the ion mobility spectrometer and the at least one radioactive substance inspection device for processing.

In a further preferred embodiment of the third aspect of the present invention, at least one sub-passageway allowing persons to be inspected to pass is provided in the inspection space, and each of the sub-passageways is provided with at least one millimeter wave imaging device for millimeter wave imaging of persons being inspected. Furthermore, the security inspection system of persons further comprises a control table for controlling operation of the at least one millimeter wave imaging device, the ion mobility spectrometer and the at least one radioactive substance inspection device and for receiving data from the at least one millimeter wave imaging device, the ion mobility spectrometer and the at least one radioactive substance inspection device for processing.

In a further embodiment of the third aspect of the present invention, an isolation means is provided at both ends of the passageway to keep the entrance and exit of the passageway at least partly isolated from the ambient environment. Furthermore, an entrance limiting unit is provided in front of the isolation means at the entrance to the passageway to control the passing of persons to be inspected. Besides, the isolation means can be made of a plastic curtain for at least partially isolating the entrance and exit of the passageway from the ambient environment. Alternatively or preferably, the isolation means can be an automatic door such as an automatic glass door to keep the entrance and exit of the passageway isolated from the ambient environment as well as to control the persons in and out of the passageway of inspection.

In a further preferred embodiment of the third aspect of the present invention, in each of the sub-passageways is marked a measuring line or measuring area. An infrared apparatus is mounted on the measuring line or measuring area to detect whether the person to be inspected reaches the measuring line or the measuring area or not.

In a further preferred embodiment of the third aspect of the present invention, the at least one millimeter wave imaging device comprises two passive millimeter wave imaging devices disposed at the location of a canopy of the passageway and respectively disposed on both sides of the measuring line or measuring area in the lengthwise direction of the passageway; furthermore, the antenna aperture planes of the two passive millimeter wave imaging devices form an angle with respect to the ground surface and face the measuring line or measuring area. Preferably, the antenna aperture planes of the two passive millimeter wave imaging devices form an angle of 60 degrees with respect to the ground surface.

In a further embodiment of the third aspect of the present invention, the at least one millimeter wave imaging device further comprises two additional passive millimeter wave imaging devices respectively disposed on both sides of the person being inspected along the measuring line or measuring area to detect both sides of the person being inspected. Furthermore, the antenna aperture planes of the two additional passive millimeter wave imaging devices form an angle with respect to the ground surface and face both sides of the person being inspected along the measuring line or measuring area. Preferably, the antenna aperture planes of the two additional passive millimeter wave imaging devices form an angle of 60 degrees with respect to the ground surface.

In another further preferred embodiment of the third aspect of the present invention, the at least one millimeter wave imaging device comprises four passive millimeter wave imaging devices respectively disposed about the person being inspected away from an advancing path of the person inspected and respectively effecting imaging of the person being inspected at four angles: left front, left rear, right front, and right rear. Preferably, the four passive millimeter wave imaging devices are orientated so that connecting lines between them and a center point of the measuring line or measuring area are respectively at about 45 degrees, 135 degrees, 225 degrees and 315 degrees with respect to the advancing direction of the person being inspected, and their respective antenna aperture planes properly face a vertical line through the center point of the measuring line or measuring area.

In a further preferred embodiment of the third aspect of the present invention, the ion mobility spectrometer uses β rays emitted by $Ni^{63}$ to ionize a gas or fine particles.

In a further preferred embodiment of the third aspect of the present invention, the ion mobility spectrometer is provided with at least one sampling port. Preferably, the at least one sampling port comprises three sampling ports provided in a vertical plane where the measuring line or measuring area lies.

In a further preferred embodiment of the third aspect of the present invention, each of the at least one radioactive substance inspection device is configured to inspect one or more of the at least one sub-passageway.

The present invention combines any two or three of the ion mobility inspection, the millimeter wave inspection, and the radioactive substance inspection technology as needed to accomplish special or full security inspection. The technical solutions resulting from a combination of any two or three of the three technologies remedy the drawback of the technical solution using only one of the said three technologies, and a security inspection solution with high accuracy, high passing rate and comprehensive and full performance. Particularly, other technical features mentioned in the preceding text can be incorporated into various technical solutions at all levels of the present invention individually or in combination.

That is to say, the security inspection system for inspecting persons according to the present invention mainly uses millimeter wave imaging device to inspect larger pieces of prohibited articles such as drugs and explosives, uses an ion mobility device to inspect prohibited articles such as trace drugs and explosives, and uses a radioactive substance inspection device to inspect presence or absence of any radioactive substances to achieved the objective of carrying out security inspection of the person being inspected in the passageway. Based on different solutions of combining the three kinds of technologies used in the present invention, it will be apprehended by a person skilled in the art that the system provided by the present invention correspondingly has some or all of the following main functions or features: 1. the system can detect whether the travelers in the passageway carry drugs and explosives or drugs and explosives are adhered to their bodies; 2. the system can detect whether the travelers in the passageway carry prohibited articles or volatile prohibited articles are adhered; 3. the system can detect trace drugs and explosives and prohibited articles; 4. the person being inspected need not unbutton his clothes; 5. the system does not require contact with the person being inspected; 6. the system does not have ionizing radiation and hence is safe for persons; 7. the system does not need complicated radiation protection; 8. the system can detect whether the person being inspected carries prohibited articles such as knives and guns; 9. the system can detect whether prohibited articles such as knives and guns are hidden on the body of the person being inspected; 10. travelers in the passageway can pass relatively smoothly at a high rate; 11. the system can fulfill concealed detection as needed; 12. as needed, sampling pipes of an appropriate number of ion mobility spectrometers can be mounted at appropriate positions of the system as needed; 13. an appropriate number of millimeter wave imaging devices can be installed in the system as needed. One set can be installed in both a front portion and a rear portion of the passageway; one set is installed respectively in a front portion, a rear portion, a left portion and a right portion of the passageway; 14. When the passageway allows several persons to pass abreast, a plurality of rows of millimeter wave imaging devices can be installed. 15. the front and rear sides of the passageway can be isolated by a plastic curtain; 16. when the front and rear sides of the passageway is isolated in a more sealed manner (e.g., a glass automatic door) and an air pressure in the passageway becomes slightly higher than the ambient air pressure, accuracy of ion mobility measurement can be improved; 17. the system can inspect whether any radioactive substance is present or not.

BRIEF DESCRIPTION OF ACCOMPANYING DRAWINGS

Figure 2:
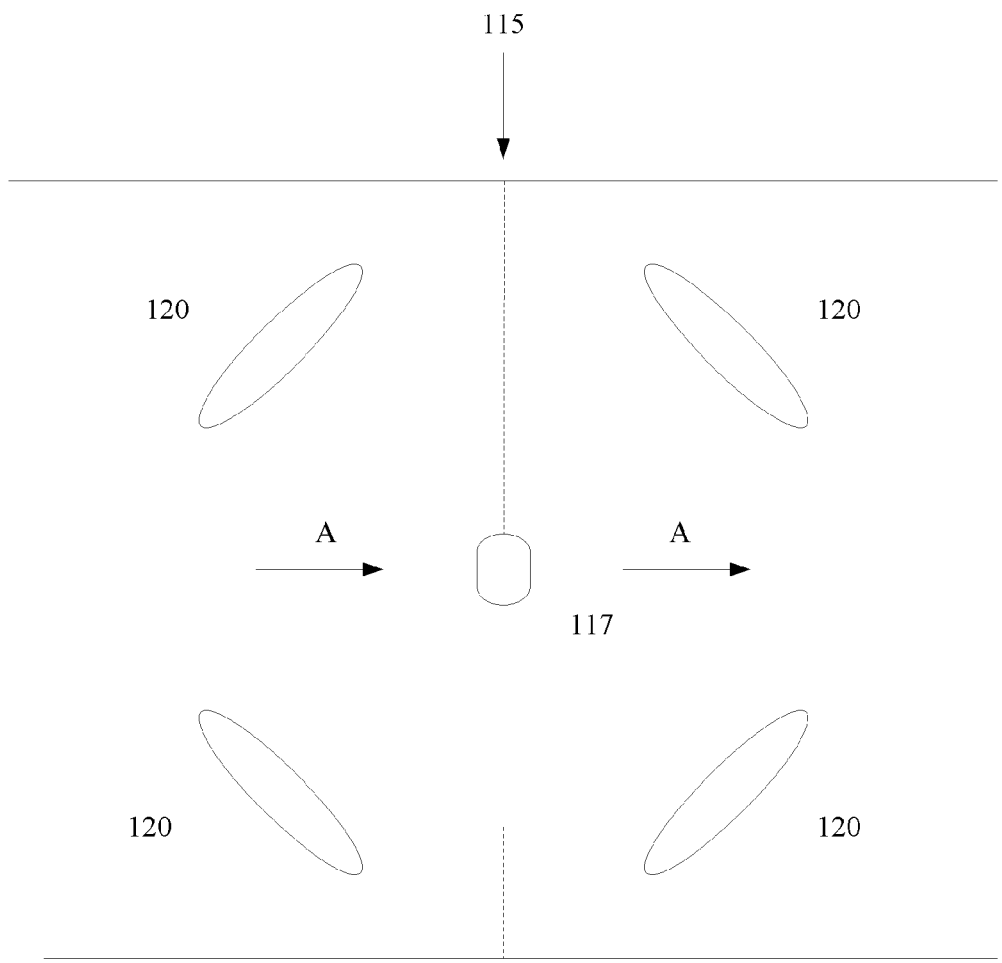

FIG. 1 is a schematic view of a security inspection system for inspecting persons according to a first embodiment of the present invention; and FIG. 2 is a schematic view of arrangement of four millimeter wave imaging devices in the security inspection system for inspecting persons according to another embodiment of the present invention.

MODES FOR CARRYING OUT THE INVENTION

Embodiment 1

In Embodiment 1 of the present invention, a security inspection system 100 for inspecting persons is provided, comprising: a passageway 110 which provides an inspection space isolated or partially isolated from an ambient environment, at least one sub-passageway allowing persons 102 to be inspected to pass is provided in the inspection space, and each of the sub-passageways is provided with at least one millimeter wave imaging device 120 for millimeter wave imaging of persons 102 being inspected; an ion mobility spectrometer 130 for ionizing particles of substance or gases that are released or volatilized from the inspected persons 102 into the air in the passageway 110 and measuring mobility rate thereof under the action of an electric field to effect identification of substances.

The security inspection system 100 of persons further comprises a control table 150 for controlling operation of the at least one millimeter wave imaging device 120 and the ion mobility spectrometer 130 and for receiving data from the at least one millimeter wave imaging device 120 and the ion mobility spectrometer 130 for processing. The control table 150 generally comprises a computer 152, a control apparatus 154, a communication apparatus 156 and an alarm apparatus 158 and is used to control the passage rate of the passageway 110 and guide the travelers in the passageway 110. The control table 150 can control the operation of the millimeter wave imaging device 120 and receive measurement data, process, display and send an alarm; can control the operation of the ion mobility spectrometer 130 and receive data, process, display and sends an alarm; and can store and manage the data. According to the principles of the present invention, specific connection modes between the control table 150 and various measuring devices and specific composition and operation modes of modules thereof are easily accomplishable for a person skilled in the art and therefore not specified herein in detail.

As shown in FIG. 1, the security inspection systems 100 for persons according to the present invention is in the form of a corridor and therefore is generally called "security inspection passageway for persons". It first of all provides a passageway 110 for control and passage of persons. The passageway 110 can for example be formed by fixing an arched canopy 118 on an appropriate ground surface so as to isolate or partially isolate the internal environment of the passageway 110 from the ambient environment. According to the depictions hereunder, such passageway not only helps improve accuracy of measurement of ion mobility but also helps installing and deploying the millimeter wave measuring devices.

The millimeter waves emitted by the millimeter wave imaging device 120 in the system can easily permeate ordinary clothes. Since millimeter wave emissivity and reflection coefficient of various substances differ (metals are more distinct from other substances in this regard), to employ millimeter wave technology for security inspection of person in the system is an ideal technical solution. When millimeter wave technology is used for security inspection, the person 102 being inspected needn't remove his clothes, and moreover the millimeter wave imaging device 120 as a detector does not contact the person's body, which is one of its major advantages. The millimeter wave technology can be used to perform detection and identification of substances with a dimension greater than one millimeter in respect of large blocks of drugs, explosives and prohibited articles, and the spatial resolution thereof is determined by wavelengths, dimensions and types of antennas. Furthermore, since metallic articles such as knives and firearms exhibit obvious emission and scattering properties of millimeter waves, they are easily detected by millimeter wave technology.

The ion mobility spectrometer 130 collects the analyzed fine particles or volatilized gases into a detector as sample gases which are ionized to form ions of substance. The ions are applied an electric field to make them mobile. Since mobility rate of ions of substance is related to ion mass, charge number, size of ions and mobility environment, the mobility rate of the ions of substance can be regarded as characteristics of substance. A majority of explosives and drugs can be gasified and ionized into negative ions and positive ions. Therefore, the ion mobility spectrometer 130 is utilized in the present invention as one of security inspection technologies to fulfill the detection of trace substance.

In addition, it will be appreciated by a person skilled in the art that the security inspection system 100 for persons according to the present invention can send alarm signals subject to millimeter wave imaging and results of measurement of ion mobility. In some embodiments, the conclusions from the two kinds of measurement modes can be mutually confirmed as needed. Furthermore, since the system of the present invention is provided at least one sub-passageway, in fact the number of sub-passageways can be reasonably set as needed to realize the objective that generally several lines of persons can pass through the passageway, and moreover more millimeter wave imaging devices can be provided and/or more ion mobility suction pipes can be provided as needed. And a visual monitor accessory can be added as needed. When the imaging visual field of the millimeter wave imaging device is wide enough, the sub-passageway can allow two or more persons to concurrently pass (i.e., allow two or more persons to be simultaneously inspected in one sub-passageway).

Specifically, as shown in FIG. 1, an isolation means 114 is provided at both ends of the passageway to keep the entrance and exit of the passageway 110 at least partly isolated from the ambient environment. The isolation means 114 can be for example made of a plastic curtain for partially isolating the passageway 110 from the ambient environment at the entrance and exit of the passageway 110. An entrance limiting unit 112 is provided in front of the isolation means 114 at the entrance to the passageway 110 to control the passing of persons 102 to be inspected. The entrance limiting unit 112 can be set to release one person every 3 seconds. Generally the passageway 110 accommodates and allows five persons to pass in a queue with certain spacing therein.

In the embodiment as shown in FIG. 1, although the passageway 110 only comprises one sub-passageway, it will be apprehended by a person skilled in the art from the depictions hereunder that the passageway 110 can comprise more sub-passageways. In the sub-passageways (in fact in the passageway for the embodiment shown in FIG. 1) is marked a measuring line or measuring area 115. An infrared apparatus (not shown) is mounted on the measuring line or measuring area 115 to detect whether the person 102 reaches the measuring line or the measuring area 115.

In the present embodiment, the millimeter wave imaging device 120 comprises two passive millimeter wave imaging devices disposed at the location of the canopy of the passageway 110. The two millimeter wave imaging devices are respectively disposed on both sides of the measuring line or measuring area 115, their aperture planes form an angle (e.g., an angle greater than zero degree less than 90 degrees, such as 40 degrees, 50 degrees, 60 degrees, 70 degrees, 80 degrees, preferably 60 degrees) with respect to the ground surface and face the measuring line or measuring area 115.

The ion mobility spectrometer 130 preferably adopts 0 rays emitted from $Ni^{63}$ to ionize a gas or fine particles. For instance, three sampling ports 132 can be provided in a vertical plane where the measuring line or measuring area lies (as shown in FIG. 1). Specifically, one sampling port is disposed on each of both sides of the passageway, and a third sampling port is disposed at a corresponding position of the canopy 118. A connecting pipe between the sampling port 132 disposed in the passageway 110 on the side away from the ion mobility spectrometer 130 and the ion mobility spectrometer 130 is preferably disposed below the ground surface.

In addition, as seen from FIG. 1, the above measuring devices (including millimeter wave imaging device 120 and the ion mobility spectrometer 130) are generally arranged in the middle portion of the whole passageway 110.

The operation procedures of the security inspection system 100 are as follows:

1. An operator energizes the system 100 and logins on a main interface of the system, the system 100 starts up and gets into a ready state after an automatic inspection, whereupon ventilation apparatuses (not shown) can be switched on as needed to ventilate the passageway 110.

2. The entrance limiting unit 112 before the entrance to the passageway 110 permits one person in every 2-3 minutes and the persons advance consecutively in the direction indicated by the arrow A, as shown in FIG. 1.

3. When a person walks to a waiting line 116 but another person ahead of him is at the measuring line or measuring area 115, he needs wait for a while. When the measuring line or measuring area 115 is not occupied, he walks towards the measuring line or measuring area 115.

4. When a person walks to the measuring line or measuring area 115 (an infrared ray can be used to judge whether he walks in place), the millimeter wave imaging device 120 and the ion mobility spectrometer 130 start up, and the results of measurement are displayed on the control table 150. When an alarm is emitted, the person being inspected will stay. If ion mobility measurement gives an alarm result, the entrance limiting unit 112 will be closed and all the persons in the passageway 110 will stay for further inspection (in an optimal solution, only the person being inspected and persons after him stay for further inspection), and a fast ventilation apparatus in the passageway 110 gets started to ventilate the passageway quickly, and the entrance limiting unit 112 begins to work on completion of the ventilation. If there is not any alarm signal, the person being inspected advances out of the passageway 110.

5. When a person walks out of the measuring line or measuring area 115, a follower walks to the measuring line or measuring area 115 for inspection.

6. When work comes to an end, the operator presses a "switch-off" button (not shown). The system 100 will be switched off after executing return operation. The operator turns off the power source. If the operator wishes to restart, turn back to the above item 1.

Embodiment 2

On basis of Embodiment 1, an extra millimeter wave imaging device (not shown) is mounted on each of both sides of the person being inspected to facilitate monitoring and measurement of both sides of the person being inspected.

Embodiment 3

Embodiment 3 is similar to Embodiment 1. But the millimeter wave imaging device 120 is replaced with four millimeter wave imaging devices. If the advancement direction of persons is regarded as x direction, and a center point 117 of the measuring line or measuring area (i.e., the central point of the area) is considered as an origin, a coordinate system is established on the plane of the ground surface. A millimeter wave imaging device 120 is respectively mounted at a location at about 45 degrees, 135 degrees, 225 degrees, and 315 degrees, and the aperture planes of the devices 120 properly face a vertical line through the origin of the coordinate system, as shown in FIG. 2 as a top view. Embodiment 3 is characterized in that the millimeter wave imaging devices 120 inspect a person from four view angles and are disposed upstanding so that persons can pass without any obstruction.

Embodiment 4

Embodiment 4 is similar to Embodiment 1. But the isolation means is modified as an automatic door such as an automatic glass door having a good sealing performance instead of a simple plastic curtain. As such, not only the entrance and exit of the passageway are isolated from the ambient environment, but also persons into and out of the passageway are controlled to function as entrance limiting unit, whereby the entrance limiting unit as shown in FIG. 1 can be cancelled. Since the present embodiment can obtain isolation having a better sealing performance, air pressure in the passageway is maintained at a level slightly higher than the ambient air pressure. In such a way, gases out of the passageway do not easily flow into the passageway so that independency of air environment in the passageway is maintained. A person skilled in the art will appreciate that a technical solution using a highly sealed door for isolation of the passageway can improve accuracy of the ion mobility measurement.

Embodiment 5

In the embodiment, the passageway is widened so that three persons can be permitted to pass abreast through the passageway. That is to say, in the present embodiment the passageway comprises three sub-passageways so that persons can take their respective sub-passageways. Besides, as for each sub-passageway, two additional millimeter wave imaging devices are respectively mounted on both sides of the millimeter wave imaging device shown in FIG. 1 (the two millimeter wave imaging devices are likewise respectively arranged on both sides of the measuring line or measuring area). The aperture planes of the antenna of the newly mounted millimeter wave imaging devices are at the same azimuthal angle as in Embodiment 1.

Embodiment 6

On basis of Embodiment 1, a radioactive substance inspection device 190 is provided at a lateral position of the person being inspected in the passageway 110. The radioactive substance inspection device 190 can be controlled by the control table 150 and display the result (obviously, the control table 150 needs to be modified accordingly, which is readily accomplishable by a person skilled in the art. No detailed depictions are given herein). When the radioactive substance inspection device 190 indicates presence of the radioactive substance and sends an alarm, an inspector asks all the persons in the passageway to stay (preferably, only the person being inspected and his followers can be asked to stay) for detailed inspection.

When the passageway 110 comprises more sub-passageways, a radioactive substance inspection device 190 is specially provided for one or more sub-passages according to the technical indexes (chiefly, the inspectable distance) of the radioactive substance inspection device 190 used. As such, when a certain radioactive substance inspection device 190 indicates the presence of any radioactive substance and sends an alarm, only all the persons being inspected in the respective sub-passageway can be asked to stay (preferably, only the person being inspected and his followers in the respective sub-passageway can be asked to stay) for further examination.

The present invention combines any two or three of the millimeter wave imaging technology, the ion mobility spectrometer technology and the radioactive substance inspection technology used in the above embodiments to form new technical solutions. According to the above detailed disclosure of the above embodiment, a person skilled in the art can easily realize other forms of combination, which will not be specified in detail herein.

According to the above embodiments, it will be appreciated by a person skilled in the art that the security inspection of "persons being inspected" as recited in the present application certainly comprises security inspection of luggage and things carried by the "persons being inspected". Therefore, the term "persons being inspected" throughout the specification of the present application should be understood as including, besides the persons being inspected themselves, luggage and things carried by them.

What is claimed is:

1. A security inspection system for inspecting persons, characterized in that it comprises:
 a passageway which provides an inspection space isolated or partially isolated from an ambient environment, wherein the inspection space includes a plurality of sub-passageways allowing persons to be inspected to pass, and wherein each of the sub-passageways is provided with at least one millimeter wave imaging device for millimeter wave imaging of persons being inspected within the sub-passageway; and
 an ion mobility spectrometer for ionizing particles of substance or gases that are released or volatilized from the inspected persons within the plurality of sub-passageways into the air in the passageway and then measuring a mobility rate thereof under the action of an electric field to effect identification of substances;
 wherein the security inspection system further characterized in that an isolation means is provided at both ends of the passageway to keep the entrance and exit of the passageway at least partly isolated from the ambient environment; and
 wherein the at least one millimeter wave imaging device is provided within the inspection space.

2. The security inspection system according to claim 1, further characterized in that an entrance limiting unit is provided in front of the isolation means at the entrance to the passageway to control the passing of persons to be inspected.

3. The security inspection system according to claim 1, characterized in that the isolation means is made of a plastic curtain for partially isolating the entrance and exit of the passageway from the ambient environment.

4. The security inspection system according to claim 1, characterized in that the isolation means is an automatic door to keep the entrance and exit of the passageway isolated from the ambient environment as well as to control the persons in and out of the passageway of inspection.

5. The security inspection system according to claim 1, characterized in that in each of the sub-passageways is marked a measuring line or measuring area, wherein an infrared apparatus is mounted on the measuring line or measuring area to detect whether the person reaches the measuring line or the measuring area or not.

6. The security inspection system according to claim 5, characterized in that the at least one millimeter wave imaging device comprises:
 two passive millimeter wave imaging devices disposed at the location of a canopy of the passageway and respectively disposed on both sides of the measuring line or measuring area in the lengthwise direction of the passageway; wherein the aperture planes of the antenna of the two passive millimeter wave imaging devices form an angle with respect to the ground surface and face the measuring line or measuring area.

7. The security inspection system according to claim 6, characterized in that the antenna aperture planes of the two passive millimeter wave imaging devices form an angle of 60 degrees with respect to the ground surface.

8. The security inspection system of persons claim 6, characterized in that the at least one millimeter wave imaging device further comprises:
 two additional passive millimeter wave imaging devices respectively disposed on both sides of the person being inspected along the measuring line or measuring area to detect both sides of the person being inspected; wherein the antenna aperture planes of the two additional passive millimeter wave imaging devices form an angle with respect to the ground surface and face both sides of the person being inspected along the measuring line or measuring area.

9. The security inspection system according to claim 8, characterized in that the antenna aperture planes of the two additional passive millimeter wave imaging devices form an angle of 60 degrees with respect to the ground surface.

10. The security inspection system according to claim 1, characterized in that the at least one millimeter wave imaging device comprises:
 four passive millimeter wave imaging devices respectively disposed about the person being inspected away from an advancing path of the person being inspected and respectively effecting imaging of the person being inspected at four angles: left front, left rear, right front, and right rear.

11. The security inspection system according to claim 10, characterized in that the four passive millimeter wave imaging devices are orientated so that connecting lines between them and a center point of the measuring line or measuring area are respectively at 45 degrees, 135 degrees, 225 degrees and 315 degrees with respect to the advancing direction of the person being inspected, and their respective aperture planes of antenna properly face a vertical line through a center point of the measuring line or measuring area.

12. The security inspection system according to claim 1, characterized in that the ion mobility spectrometer uses β rays emitted by $Ni^{63}$ to ionize a gas or fine particles.

13. The security inspection system according to claim 1, characterized in that the ion mobility spectrometer is provided with at least one sampling port in the passageway.

14. The security inspection system according to claim 13, characterized in that the at least one sampling port comprises three sampling ports provided in a vertical plane where the measuring line or measuring area lies.

15. The security inspection system according to claim 1, characterized in that
 at least one radioactive substance inspection device is provided in the passageway for detecting whether the persons being inspected carry radioactive substances.

16. The security inspection system according to claim 15, characterized in that each of the at least one radioactive substance inspection device is configured to inspect one or more of the plurality of sub-passageways.

17. A security inspection system for inspecting persons, characterized in that it comprises
 a passageway which provides an inspection space isolated or partially isolated from an ambient environment, wherein the inspection space includes a plurality of sub-passageways allowing persons to be inspected to pass;
 an ion mobility spectrometer for ionizing particles of substance or gases that are released or volatilized from the inspected persons into the air in the passageway and then measuring a mobility rate thereof under the action of the electric field to effect identification of substances; and
 at least one radioactive substance inspection device in the passageway for detecting whether the persons being inspected carry radioactive substances, each being configured to inspect one or more of the plurality of the sub-passageways;
 wherein the security inspection system further characterized in that an isolation means is provided at both ends of the passageway to keep the entrance and exit of the passageway at least partly isolated from the ambient environment.

18. The security inspection system according to claim 17, characterized in that each of the sub-passageways is provided with at least one millimeter wave imaging device for millimeter wave imaging of persons being inspected within this sub-passageway, wherein the at least one millimeter wave imaging device is provided within the inspection space.

* * * * *